United States Patent [19]

Fujii et al.

[11] 4,356,295

[45] Oct. 26, 1982

[54] PROCESS FOR POLYMERIZING OLEFINS

[75] Inventors: Masaki Fujii; Shiro Goto, both of Yokkaichi, Japan

[73] Assignee: Mitsubishi Petrochemical Company Limited, Japan

[21] Appl. No.: 43,732

[22] Filed: May 30, 1979

[30] Foreign Application Priority Data

Jun. 5, 1978 [JP] Japan ................................. 53-67446

[51] Int. Cl.³ .......................... C08F 4/02; C08F 10/06
[52] U.S. Cl. ................................ 526/125; 252/429 B; 252/429 C; 526/114; 526/115; 526/116; 526/122; 526/351; 526/903; 526/906
[58] Field of Search ............... 526/125, 114, 115, 116, 526/122

[56] References Cited

U.S. PATENT DOCUMENTS

| | | | |
|---|---|---|---|
| 4,071,672 | 1/1978 | Kashiwa | 526/125 |
| 4,085,276 | 4/1978 | Toyota et al. | 526/125 |
| 4,107,415 | 8/1978 | Giannini et al. | 526/114 |
| 4,124,532 | 11/1978 | Giannini et al. | 526/125 |
| 4,143,223 | 3/1979 | Toyota et al. | 526/142 |
| 4,149,990 | 4/1979 | Giannini et al. | 526/125 |
| 4,156,063 | 5/1979 | Giannini et al. | 526/125 |
| 4,168,361 | 9/1979 | Oda et al. | 526/122 |
| 4,175,171 | 11/1979 | Ito et al. | 526/125 |

FOREIGN PATENT DOCUMENTS

| | | | |
|---|---|---|---|
| 2135884 | 1/1972 | Fed. Rep. of Germany | 526/125 |
| 2137872 | 2/1972 | Fed. Rep. of Germany | 526/125 |
| 2644440 | 4/1977 | Fed. Rep. of Germany | 526/125 |
| 2734652 | 2/1978 | Fed. Rep. of Germany | 526/125 |
| 50-44273 | 4/1975 | Japan | 526/125 |
| 1335887 | 10/1973 | United Kingdom | 526/125 |

Primary Examiner—Edward J. Smith
Attorney, Agent, or Firm—Robert E. Burns; Emmanuel J. Lobato; Bruce L. Adams

[57] ABSTRACT

A process for polymerizing an olefin which comprises causing the olefin to contact a catalyst comprising a combination of a component A which is a solid composition A obtained by causing:

(a) a solid which contains a halogen-containing compound of a metal selected from the group consisting of magnesium, manganese, zinc and calcium,
(b) a titanium compound,
(c) a metal halide type Lewis acid which may be used as Friedel-Crafts catalyst, and
(d) an organic compound selected from the group consisting of halohydrocarbons, halogen-containing organic acid esters and alcohols, to contact each other and a component B which is an organoaluminum compound.

3 Claims, No Drawings

PROCESS FOR POLYMERIZING OLEFINS

BACKGROUND OF THE INVENTION

1. Field of the Art

The present invention relates to a process for polymerizing olefins through the use of a so-called Ziegler-Natta type catalyst. More particularly, the present invention relates to a process for polymerizing olefins which is characterized by the catalyst used which falls under the category of a so-called supported catalyst with respect to its transition metal catalytic component.

A solid titanium compound in a low valence state, such as titanium trichloride, has been heretofore used in combination with an organoaluminum compound as a catalyst for the homopolymerization and copolymerization of olefins. However, such a catalyst exhibits a low catalytic activity and produces polymers having low stereospecificity in the stereospecific polymerization. Accordingly, it is necessary to remove the catalyst residue from the resultant polymer and to extract amorphous polymers therefrom.

In order to overcome these problems, various studies have been directed to so-called supported catalysts comprising various titanium compounds deposited on a support. Up to now, however, a catalyst capable of eliminating the need for a process for removing the catalyst and a process for extracting amorphous polymers has not been realized.

In addition, the supported catalyst is subjected to milling or other treatment to reduce the size of the constitutional particles of the catalyst, thereby increasing the surface area of the particles, in order to ensure that the catalyst will exhibit a high catalytic activity. As a consequence, the granule properties (for example, particle size distribution and bulk density) of the resulting catalyst and thus a polymer obtained by using this catalyst deteriorate greatly. This deterioration of the granule properties causes serious problems in the production process of the catalyst and polymers. For example, these problems are a reduction in the volume efficiency of a reactor due to a reduction in bulk density, difficulties in the transportation of a suspension of the polymer particles, and the escape of fine particles in a fluidized bed type polymerization reactor.

2. Prior Art

In recent years, a few representative proposals have been made on a supported catalyst using a magnesium halide as a support which is intended to increase the polymer yield per titanium catalytic component.

For example, Japanese Patent Unexamined Publication No. 16986/1973 proposes a catalyst for polymerizing olefins which comprises a combination of (a) a solid catalytic component prepared by co-pulverizing a complex of a titanium compound and an electron donor with an anhydrous magnesium halide and (b) an addition reaction product of an alkyl aluminum and an electron donor. However, as far as the present inventors know, it may be difficult to say that this process can provide sufficiently high polymer yield per titanium catalytic component and stereospecificity of the resultant polymer.

On the other hand, Japanese Patent Unexamined Publication Nos. 36786/1977 and 36913/1977 disclose a solid catalytic component prepared by treating with a titanium tetrahalide a copulverized mass of (a) a complex of an anhydrous magnesium halide and an electron donor and (b) a silicon compound. However, it may also be difficult to say that this catalyst can provide sufficiently high polymer yield per titanium catalytic component and polymer yield per halogen atom contained in the solid catalytic component, and it may not be conceivable that this catalyst can eliminate the necessity of a process stage for removing the catalyst residue. In addition, it may be difficult to say that the stereospecificity of the resulting polymer is increased to a degree such that the process stage for extracting the amorphous polymer, a by-product, can be omitted.

SUMMARY OF THE INVENTION

It is an object of this invention to provide a process for polymerization of olefins by which remarkable improvements in the granule properties of the resulting polymers, in their catalytic activity and their stereospecificity can be obtained. This object and other objects can be achieved by using a solid catalytic component comprising specific constituents as summarized below and described in detail hereinafter.

The process for polymerizing olefins according to the present invention is characterized in that an olefin is polymerized by causing it to contact a catalyst comprising a combination of a component A which is a solid composition A obtained by causing (a) a solid which contains a halogen-containing compound of a metal selected from the group consisting of magnesium, manganese, zinc and calcium, (b) a titanium compound, (c) a metal halide of a Lewis acid which can be used as a Friedel-Crafts catalyst, and (d) an organic compound selected from the group consisting of halohydrocarbons, halogen-containing organic acid esters and alcohols to contact each other, and a component B which is an organoaluminum compound.

As evidence of the effectiveness of this invention, the objects thereof are achieved.

Although it is considered that this effectiveness is attributable to a combination of the multiple specific catalytic constituents, it can be reasoned that it is mainly due to the use of the above described constituents (c) and (d). That is, the constituents (c) and (d), when previously reacted with each other in the reaction of the constituents (a) through (d), as is preferable, produce a material which is pale-yellow or black and viscous or in millet jelly state and is soluble in halohydrocarbons but insoluble in hydrocarbons such as hexane, and it appears that this viscous material acts as a binder at the time of the contact of the components (a) and (b) and in the subsequent process step for removing the component (d) which is usually carried out, thereby providing an intimate combination of the fine particles of the resultant supported catalyst.

Thus, a solid catalytic component having a narrow particle size distribution and a relatively large particle size is obtained. Also, it appears that the viscous material causes the supported titanium species to be strongly fixed to a support. Thus, it is considered that the titanium species are prevented from being liberated during conventional washing of the solid catalytic component with hydrocarbons, thereby realizing an improvement in the activity of the resultant catalyst and the stereospecificity of the resultant polymer. It is to be noted that this viscous material has no adverse effect whatsoever on the essential performance of the resulting catalyst.

DETAILED DESCRIPTION OF THE INVENTION

1. Constituent (a)

The constituent (a) is a solid which contains a halogen-containing compound of a metal selected from the group consisting of magnesium, manganese, zinc, and calcium. One group of the constituent (a) is a halide (including a hydroxyhalide) of magnesium or any of the other metals, itself, and another group thereof is the halide treated with an electron donor. It should be understood that the term "solid which contains a halogen-containing compound" used herein is intended to include these two groups.

(1) Halide compound of Mg or any of the other metals

Examples of the halide compound are magnesium chloride, magnesium bromide, magnesium iodide, manganese chloride, manganese bromide, calcium chloride, zinc chloride, magnesium hydroxychloride, and complexes of triethylaluminum and the above mentioned compounds. These compounds may be used singly or in combination. Among these, magnesium chloride is preferable for the purpose of obtaining a catalyst having a high catalytic activity.

It is desirable that these metal halide compounds be substantially anhydrous. Also, it is desirable that these halide compounds usually have a surface area of no less than 1 m²/g and a particle size of not greater than 200μ. However, these conditions are not strictly mandatory.

Although these metal halide compounds may be used as they are in the present invention provided that they are not too massive, they are preferably subjected to a pulverization process. In the pulverization process, these halide compounds may also be copulverized together with silicon tetrachloride or lithium chloride.

(2) Metal halide treated with electron donor compound

The metal halide compound which is preferred for the present invention is one which has been treated with an electron donor compound (hereinafter referred to as electron donor).

(1) Electron donor

The electron donor is selected from various compounds containing at least one member selected from the group consisting of oxygen, nitrogen, phosphorus and sulfur atoms. Examples of the electron donor are ethers, esters, ketones, amines, acid amides, nitriles, aldehydes, phosphorus compounds, and sulfur compounds.

More specific examples of the electron donor are as follows.

(a) Ethers having from 2 to 12 carbon atoms and from 1 to 10 ether oxygen atoms.

Examples of such ethers are diethyl ether, dibutyl ether, ethylbutyl ether, hexyl ether, vinylmethyl ether, ethylallyl ether, methylcyclopentyl ether, allylmethylcyclohexyl ether, phenetole, phenylvinyl ether, tetrahydrofuran, dioxane, ethylene glycol dimethyl ether, diethylene glycol diethyl ether, diphenyl ether, anisole, veratrole, m-dimethoxybenzene, and p-dimethoxybenzene.

(b) Carboxylic acid esters derived from carboxylic acids having from 1 to 12 carbon atoms and alcohols having from 1 to 12 carbon atoms.

Examples of such carboxylic acid esters are methyl formate, dodecyl formate, ethyl acetate, vinyl acetate, butyl acetate, phenyl acetate, benzyl acetate, 2-ethylhexyl acetate, octyl butyrate, ethyl acrylate, methyl methacrylate, octyl laurate, t-butyl crotonate, methyl benzoate, ethyl benzoate, propyl benzoate, phenyl benzoate, cyclohexyl benzoate, ethyl toluylate, methyl anisate, dimethyl phthalate, dibutyl isophthalate, dioctyl terephthalate, methyl naphtoate, and methyl cyclopentanecarboxylate.

(c) Ketones having from 3 to 13 carbon atoms.

Examples of such ketones are acetone, methyl ethyl ketone, methyl isobutyl ketone, ethyl butyl ketone, dihexyl ketone and acetophenone.

(d) Aldehydes having from 1 to 12 carbon atoms.

Examples of such aldehydes are acetaldehyde, propionaldehyde, isobutylaldehyde and benzaldehyde.

(e) Amines, nitriles and acid amides having from 1 to 12 carbon atoms.

Examples of such compounds are methylamine, diethylamine, octylamine, dodecylamine, allylamine, aniline, naphtylamine, cyclohexylamine, N-N-N'-N'-tetramethylethylenediamine, 1,2,4-trimethylpiperazine, acetonitrile, acrylonitrile, valeronitrile, benzonitrile, phthalonitrile, acetamide, acrylamide and tetramethylurea.

(f) Phosphorus compounds

The phosphorus compounds include phosphines, organic phosphites and phosphoryl compounds. Examples of such compounds are triphenyl phosphite, tritolyl phosphite, triethyl phosphite, triphenylphosphine, tributylphosphine, and phosphoryl trichloride.

(g) Sulfur compounds

Suitable sulfur compounds are those which contain a carbon atom. Examples of such compounds are carbon disulfide, diethyl sulfide, diphenyl sulfide, diethyl sulfate, methyl ethyl sulfone, di(2-propenyl) sulfone, methyl phenyl sulfone, divinyl sulfone, and methyl cyclobutenyl sulfone.

These compounds can also be used in mixtures of two or more compounds within the respective groups and between the respective groups. Among these compounds, the carboxylate esters, particularly benzoate esters, are preferable.

(2) Treatment of halides of Mg and the other metals with an electron donor

Treatment method:

The treatment can be carried out by using various methods allowing the contact between the two constituents.

Examples of such methods are: a method which comprises suspending or dissolving halides of Mg and the other metals in an electron donor or an inert solvent containing an electron donor and recrystallizing the halides from the suspension or solution by the aid of a suitable reagent; a method which comprises subjecting such a suspension to heat treatment; a method which comprises pulverizing the solid obtained by the above described methods; and a method which comprises subjecting an electron donor and a halide of Mg or any of the other metals to mechanical pulverization.

Although the temperature at which the two constituents are brought into contact with each other is not critical, it is preferably in the range of from 0 to 300° C., particularly from 20° to 200° C., irrespective of the boiling point of the electron donor used. Quantity ratio:

The ratio by weight of the electron donor to the halide of Mg and any of the other metals depends, specifically, upon the contact method used, but, in general, it is in a wide range of 0.001 to 100:1. When the ratio is less than 0.001, because of the small quantity of an electron donor, the resultant solid composition (A) has an extremely low content of titanium. On the other hand, when the ratio is greater than 100, a large quantity of excessive electron donor taking no part in the treatment of the metal halide with the electron donor remain, which is wasteful from the standpoint of material balance.

In the case where the contact between the two constituents is carried out by mechanical pulverization, a ratio by weight of the two constituents of 0.001 to 20:1 affords ample effectiveness.

Additionally, in the electron donor treatment, pulverizing adjuvants such as $SiCl_4$, polysiloxane, and halohydrocarbons may also be added.

2. Constituent (b)

The constituent (b) is a titanium compound, and representative examples thereof can be classified into the following groups. These compounds can be used in combinations of two or more compounds both within the respective groups and between these groups. Among these, those which fall within the first group are preferred.

(1) Halogen-containing titanium compound

The representative compound is a halogen-containing titanium compound in which the titanium is di-, tri-, or tetra-valent. Examples of such a compound are as follows:

$TiCl_4$; $TiBr_4$; $TiI_4$; $TiCl_3$; $TiCl_2$; $Ti(OC_3H_7)Cl_3$; titanium trichloride compositions which are reduction products of tetravalent titanium compounds with reducing agents that may be various metals, metal hydrides or organic metal compounds and in which the titanium trichloride is complexed with the metal of the reducing agents (for example, $TiCl_3.\frac{1}{3}AlCl_3$, $TiCl_3.3MgCl_2$); $Ti(OC_4H_9)_2Cl_2$; $Ti[N(C_2H_5)_2]Cl_3$; $Ti[O-C(CH_3)=CH-CO-CH_3]_2Cl_2$; $Ti[N(C_6H_5)_2]Cl_3$; $Ti(OCOC_6H_5)Cl_3$; $TiCl_3OSO_2C_6H_5$; $[N(C_4H_9)_4]_2TiCl_6$; $[N(C_4H_9)_4]Ti_2Cl_9$; and $LiTi(OC_3H_7)_2Cl_2$.

Among these compounds, $TiCl_4$, $TiBr_4$, $TiI_4$, and $TiCl_3.\frac{1}{3}AlCl_3$ are preferable, and $TiCl_4$ is particularly preferable.

(2) Addition compound with an electron donor

Representative addition compounds are those which are prepared by the addition between the above described compounds (1) and the electron donors as described in connection with the above mentioned constituents (a). Examples of such compounds include $TiCl_4.C_6H_5COOC_2H_5$, $TiCl_4.2C_6H_5COOC_2H_5$, $TiCl_4.p\text{-}CH_3C_6H_5COOC_2H_5$, $TiCl_4.CH_3COOC_2H_5$, $TiCl_3.C_6H_5COOC_2H_5$, $TiCl_3.\frac{1}{3}AlCl_3.C_6H_5COOC_2H_5$, $TiCl_4.(CH_3)_2NC_2H_4N(CH_3)_2$, $TiCl_3.(CH_3)_2NC_2H_4N(CH_3)_2$, and $TiCl_4.2(CH_2)_4=O$.

These titanium compounds (1) and (2) which are solid in nature may also be dissolved in a solvent such as a hydrocarbon or a halohydrocarbon by various means before they are used. The addition compounds of the above mentioned halogen-containing titanium compounds with benzoic acid esters are particularly preferred.

3. Constituent (c)

Metal halide of Lewis acids which may be used as Friedel-Crafts catalysts are described in detail in G. A. Olah, "Friedel Crafts and Related Reactions", Vol. 1, published by Interscience Publishers, 1963.

More specifically, mention may be made of halides of metals such a Al, B, Be, Bi, Cd, Fe, Ge, Sb, Sn, V, Zn and Zr.

Examples of such halides are $AlCl_3$, $AlBr_3$, $BCl_3$, $BF_3$, $BBr_3$, $BeCl_2$, $BiCl_3$, $CdCl_2$, $FeCl_3$, $GaCl_3$, $SbCl_3$, $SbCl_5$, $SnCl_4$, $VCl_4$, $ZnCl_2$ and $ZrCl_4$.

These compounds can also be used in combination with each other or with other compounds.

Among these metal halides, halides of Al, B, Be, Fe and Zn are suitable. Halides of Al are optimal.

A sole essential condition for these Lewis acids (constituent (c)) is that they be able to react with the constituent (d) described hereinafter during the formation of the catalytic component A thereby to yield a viscous material as described hereinafter.

4. Constituent (d)

An organic compound selected from the following three groups may be used as the constituent (d). These compounds may be used in combinations of two or more compounds within the respective groups and between the respective groups. Among these, those which fall within the groups (1) and (2) are preferable.

(1) Halohydrocarbon

One group of the materials which are to be reacted with the constituent (c) is of halohydrocarbons. Halohydrocarbons having from about 1 to 12 carbon atoms are preferable.

Examples of particularly preferred halohydrocarbons are aliphatic halohydrocarbons such as chloromethane, carbon tetrachloride, 1,2-dichloroethane, n-butyl chloride, allyl chloride, isoamyl chloride, n-octyl chloride, vinyl chloride, propenyl chloride, ethylidene dichloride, propylene dichloride, propylidene dichloride, butyl bromide, 1,1,1-trichloroethane, 1,1,2-trichloroethane, 1,1,2-trichloro-1,2,2trifluoroethane, trichlorofluoromethane, tetrachloroethane, tetrachloroethylene, and ethylidene diiodide; alicyclic halohydrocarbons such as cyclohexyl chloride, methylcyclohexyl chloride, ethylcyclohexyl chloride, cyclohexyl iodide, cyclohexyl bromide, and methylcyclohexyl iodide; and aromatic halohydrocarbons such as chlorobenzene, m-chlorotoluene, o-chlorotoluene, p-chlorotoluene, 2-chloroethylbenzene, 3-chloroethylbenzene, 2-chloro-p-xylene, 1,2-dichloronaphthalene, 1,7-dichloronaphthalene, benzyl chloride, iodobenzene, o-iodotoluene, p-chlorobenzyl chloride, benzyl bromide, and benzyl iodide.

(2) Halogen-containing organic acid ester

Esters derived from a carboxylic acid having from 1 to 12 carbon atoms (particularly mono- or di-carboxylic acids) and an alcohol having from 1 to 12 carbon atoms (particularly lower monohydric alcohols) and containing at least one halogen atom attached to one or both of the carboxylic acid moiety and the alcohol moiety are representative.

Examples of such esters are methyl chloroformate, ethyl chloroacetate, ethyl dichloroacetate, ethyl iodoacetate, ethyl dibromoacetate, ethyl trichloroacetate, diethyl chlorosuccinate, ethyl α-chloropropionate, ethyl β-iodopropionate, ethyl o-chlorobenzoate, ethyl p-chlorobenzoate, butyl p-bromobenzoate, 2-chloroethyl benzoate, ethyl 2,4-dichlorobenzoate, ethyl 2,5-dichlorobenzoate, ethyl 2,4-dibromobenzoate, ethyl 2,6-dibromobenzoate, propyl 2,4-dibromobenzoate, p-chlorophenyl benzoate, ethyl 2-chloro-4-nitrobenzoate, ethyl bromocinnamate, di-2-chloroethyl terephthalate, ethyl o-bromotoluylate, 2-chloroethyl acetate, dichlorobutyl acetate, 2-chloroethyl p-chlorobenzoate, and dichloropropyl benzoate. Preferred esters are acetate esters or benzoate esters having a chloro-substituent, such as ethyl chloroacetate, ethyl p-chlorobenzoate, ethyl 2,4-dichlorobenzoate, and ethyl 2,5-dichlorobenzoate.

The use of these halogen-containing organic acid esters as the constituent (d) results in a higher crystallinity of the resulting olefin polymer than does the use of the other constituent (d), halohydrocarbons, or alcohols.

(3) Alcohol

As the alcohol, organic compounds which contain a hydroxyl group and having from 1 to 14 carbon atoms are used. The term "alcohol" used herein is intended to include glycols and phenols as well as alcohols in a narrow sense.

Examples of such alcohols are ethyl alcohol, butyl alcohol, octanol, 2-chloroethanol, 2-ethyl-1-hexanol, allyl alcohol, ethylene glycol monoethyl ether, ethylene glycol, 1,3-propanediol, phenol, o-chlorophenol, m-chlorophenol, p-bromophenol, o-allylphenol, benzyl alcohol, 1,5-pentanediol, glycerine, o-cresol, p-cresol, trans-1,4-cyclohexanediol, and 2-hydroxyethyl acetate. p-Chlorophenol and o-cresol are preferable.

5. Contacting of the constituents (a), (b), (c) and (d)

(1) Contact method

The four constituents can be caused to contact each other according to any combination of contact order. However, it is particularly preferable that the constituents (c) and (d) be previously caused to contact each other and thereby react.

Some examples of the contact order are as follows:

(1) a+b+c+d (the four constituents are simultaneously caused to contact each other),
(2) (a+b)+(c+d) ((a) and (b), and (c) and (d) are brought into contact, respectively, and thereafter the resulting two mixtures are brought into contact with each other),
(3) (a+c+d)+b,
(4) [a+(c+d)]+b,
(5) [(a+c)+d]+b,
(6) [b+(c+d)]+a,
(7) (a+b)+(c+d)+b,
(8) [(a+b)+b]+(c+d), and
(9) [a+b+(c+d)]+b.

The contact order is not limited to the above mentioned orders. For example, use may be made of a method in which the constituent (b) and the reaction product of the constituents (c) and (d) are alternately contacted two or more times with the constituent (a).

Whichever method may be adopted, it is important that the respective constituents (a), (b), (c) and (d) be caused to thoroughly contact each other and the constituents (c) and (d) be converted into a viscous material. Particularly when an alcohol is used as the constituent (d), the direct contact of the alcohol with the constituent (b) may, in some cases, cause the constituent (b) to be so denaturalized that it may be deactivated. Accordingly, it is suitable that after the alcohol has been previously brought into intimate contact with the other constituents, the resultant constituent mixture be caused to contact the constituent (b).

An important feature of the present invention resides in that the constituents (c) and (d) are reacted with each other to form a binder during the formation of the catalytic component. Therefore, it is preferable that the constituents (c) and (d) be previously reacted with each other to form a viscous material.

(2) Contact means

The contacting of the four constituents may be carried out by utilizing mechanical contact means using various milling machines such as vibration ball mill, rotation ball mill, and impact mill, by using a vessel provided with an agitator, or by suspending these constituents in a fluid. Different means may also be adopted in the processes of the contacting order of the various constituents. In addition, during the contacting of the constituents, an inert solvent such as a saturated hydrocarbon, e.g., pentane, hexane, heptane, or cyclohexane may also be used.

The temperature at which the contact treatment is carried out is generally in a range of from $-80°$ to $300°$ C., and preferably in the range of from $-30°$ to $200°$ C.

The time duration of the contacting treatment is not critical, generally, although it is usually in a range of from 1 minute to 500 hours per process. From the standpoint of the efficiency of catalyst preparation, the contact time is preferably in a range of from 10 minutes to 10 days, and most preferably in the range of from 30 minutes to 100 hours.

As described above, in a preferred embodiment of the present invention, the constituents (c) and (d) are previously reacted with each other. In this case, the reaction of these two constituents is carried out at a temperature of from $-120°$ to $300°$ C., preferably from $-80°$ to $250°$ C.

The quantity of the constituent (d) (halohydrocarbon or the like) is ordinarily greater than an equivalent quantity of the constituent (c) (metal halide). In order to ensure that the constituent (d) serve as a dispersion medium, it is preferable that the constituent (d) be used in a quantity 1.1 to 1,000 times by mole, more preferably 1.1 to 500 times by mole, that of the constituent (c). When the quantity of the constituent (d) is greater than 500 times by mole, particularly 1,000 times by mole, the resulting product is diluted to an excessive extent, and, as a result, the apparatus should be greatly increased in size for practical purposes. In addition, the reaction may be carried out in another dispersion medium or solvent such as an inert hydrocarbon, carbon disulfide, or nitrobenzene.

The reaction time is not critical provided that the desired conversion is achieved, although it is practically in a range of from 1 minute to 100 hours. From the standpoint of an industrial utilization value, it is preferably in a range of from 10 minutes to 50 hours.

(3) Quantity ratio (1) Weight ratio of constituents (a) and (b)

The weight ratio of constituents (a) and (b), (a):(b), is generally in a range of from 1:0.01 to 10,000, preferably from 1:0.01 to 1,000, although it may be varied over a wide range depending upon the contacting method used or the state of the constituent (b). In the case where milling is used as the contacting method, the ratio may be in a range of from 1:0.01 to 500 because the constituent (b) may be more effectively deposited on a support.

(2) Weight ratio of constituent (a) to reaction product of constituents (c) and (d)

Even if either of the constituents (c) and (d) is present in an excessive quantity, these constituents cannot exhibit their effect to an adequate degree because the reaction product of these constituents contributes to the effectiveness of the present invention. Accordingly, if the weight ratio of the constituents (c) and (d) is represented in terms of the reaction product, the ratio by weight of constituent (a) to the reaction product of constituents (c) and (d) is ordinarily in a range of from 1:0.001 to 100, preferably from 1:0.005 to 50. When the ratio of the reaction product is less than 0.001, the advantage of adding the constituent (c) may not be obtained to a substantial degree. On the other hand, when the ratio of the reaction product is greater than 100, the polymerization activity of the resultant catalyst may be reduced and the properties of the resultant polymer may greatly deteriorate.

6. Component B

The component B is an organoaluminum compound which is to be combined with the solid composition (A) obtained as described above, i.e., a solid catalytic component containing a transition metal, to form Ziegler-Natta type catalysts.

A suitable organoaluminum compound is generally a compound represented by the formula:

$$AlR_mX_{3-m}$$

wherein R represents hydrogen or a hydrocarbyl group having from about 1 to 10 carbon atoms, X represents a halogen or an alkoxy group having from about 1 to 12 carbon atoms and m is in a range of $1 < m \leq 3$. The organoaluminum compound can be used in mixtures of the two or more of the compounds represented by the formula. In this case, the mixture may be indicated as, for example, a compound having an average composition of $AlR_{2.5}X_{0.5}$.

Examples of such aluminum compounds are triethylaluminum, tri-n-propylaluminum, tri-i-butylaluminum, tri-n-octylaluminum, tri(2-methylpentyl)aluminum, di-i-butylaluminum hydride, ethylaluminum sesquichloride, diethylaluminum chloride, ethylaluminum dichloride, diethylaluminum ethoxide, and diethylaluminum iodide.

7. Quantity ratio of component B to component A

The ratio by mole of the organoaluminum compound (component B) to titanium atom in the solid catalyst component A is ordinarily in a range of from 1 to 500:1, preferably from 3 to 400:1, particularly preferably 5 to 300:1. If the ratio is less than 1, there will be almost no activation of the solid catalyst component A. If the ratio is greater than 500, unused organoaluminum compound remains in a large quantity, which is unfavorable from an economical point of view, and, at the same time, this compound is mixed into the resultant polymer, whereby the quality of the polymer deteriorates. Moreover, when such a catalyst is used in the polymerization of α-olefins, the stereospecificity of the resultant polymer becomes extremely poor. In any case, advantageous effects may not be obtained.

However, because the component B has an influence on the catalytic activity of the resulting catalyst, it is possible, in practice, to set the ratio in question at a relatively high level to obtain a higher activity and to prevent a reduction in stereospecificity due to such a high activity by using a combination with an electron donor compound, thereby attaining an improvement in the balance between activity and stereospecificity which could not be achieved only by a combination of the components A and B. The electron donor compound suitable for this purpose may be selected from the electron donors described in item (2) of the above described constituent (a).

8. Polymerization of olefins

The process for polymerizing olefins according to the present invention is essentially the same as a conventional process using a Ziegler-Natta type catalyst except that the catalyst [particularly the transition metal component (component A)] used is as described above.

Accordingly, one or more olefins having from about 2 to 18 carbon atoms may be polymerized according to the present invention. Examples of such olefins are ethylene, propylene, 1-butene, 1-pentene, 1-hexene, 1-heptene, 1-octene, 1-nonene, 1-decene, 1-methyl-1-pentene, 4-methyl-1-hexene, 5-methyl-1-hexene, 4,4-dimethyl-1-pentene, 4-methyl-1-heptene, 5-methyl-1-heptene, 6-methyl-1-heptene, and 4,4-dimethyl-1-hexene. Such 1-olefins may be copolymerized with monomers copolymerizable therewith such as vinyl acetate and lower alkyl ($C_1$ to $C_{12}$ alkyl) acrylic esters. Particularly preferred olefins which are intended to be polymerized according to the present invention are ethylene, propylene, 1-butene and 1-hexene.

Mixtures of these olefins may be used. For example, in the case of the polymerization of propylene, propylene may be copolymerized with up to 20% by weight, preferably up to 10% by weight, of propylene of the other olefins, preferably ethylene.

The polymerization of olefins may be carried out by a slurry polymerization method, where an inert hydrocarbon such as hexane or heptane is used as a solvent; a liquid phase polymerization method, where a liquefied monomer is used as a solvent; or a vapor phase polymerization method, where a monomer is present in vapor phase. The vapor phase polymerization method is most suitable because of the good shape of the resultant polymer particles. The polymerization may be carried out by a continuous or batch process.

Hydrogen may be added in the polymerization process in order to adjust the molecular weight of the resultant polymer.

9. Experimental Examples

Examples of the present invention are set forth hereunder. These examples are presented to illustrate the scope of the present claims, not to limit it.

EXAMPLE 1

(1) Preparation of a solid which contains a halogen-containing compound of a metal such as Mg (hereinafter merely referred to as support)

20.0 g of anhydrous magnesium chloride and 6.0 ml of ethyl benzoate were placed in a vibration mill pot under a nitrogen atmosphere. This pot was made of stainless steel (Japanese Industrial Standards designation SUS 314) and had an inner capacity of 800 ml, being filled with 300 balls, each having a diameter of 12 mm, which were made of SUS 314.

The vibration mill was operated at a total vibration amplitude of 4.0 mm and a rotational speed of 1,200 rpm for 24 hours to pulverize the contents of the pot. 6.0 ml of ethyl benzoate was further added and milling was continued for another period of 24 hours, thereby to prepare a support.

(2) Preparation of a reaction product of a Lewis acid and an organic compound such as halohydrocarbons (hereinafter merely referred to as Lewis acid reaction product)

8.3 g of anhydrous aluminum chloride which was purified by sublimation and 25.0 ml of dry 1,2-dichloroethane were added to a flask having an inner volume of 200 cc, and the flask was heated at the boiling temperature of 1,2-dichloroethane for 2 hours. The reaction proceeded as white fumes were vigorously given off until the solid aluminum chloride completely disappeared.

A viscous black solution was obtained as a reaction product. The as-produced solution was used in the preparation of a catalyst.

(3) Preparation of a solid catalyst component (A)

10.0 g of the support prepared in step (1), 1.3 ml of the solution prepared in step (2), and 2.2 ml of titanium tetrachloride were placed in a ball mill pot having an inner volume of 800 ml under a nitrogen atmosphere. The pot was charged with 100 balls having a diameter of 15 mm and made of SUS314, and the pot was operated at a rotational speed of 120 rpm for 24 hours thereby to pulverize the mixture. The resultant powder was washed with purified n-hexane to obtain a solid catalyst component (A). The solid catalyst component had a content of Ti atoms of 2.73% by weight.

(4) Polymerization of propylene: liquid phase polymerization

A 3-liter autoclave provided with stirring means whose inside atmosphere was completely displaced with propylene gas was charged with 28.6 mg of triethyl aluminum (catalyst component B) and 36.6 mg (which corresponds to 1.00 mg as calculated in terms of Ti atoms) of the solid catalyst component obtained as described above. Stirring was started and 1.0 kg of liquefied propylene was introduced into the flask at room temperature. After the elapse of 10 minutes, the temperature of the mixture was increased to 70° C., and the polymerization was continued at that temperature for 1 hour.

460 g of a white polymer was obtained. The yield of the polymer was 12.6 kg per g of the solid catalyst component (A) which corresponded to 460 kg per g of Ti atoms. The polymer which could not be extracted with boiling heptane was 94.6% by weight. The bulk density of the polymer was 0.40 g/cc. Also, the polymer had a 50% average particle size of 800 microns and not greater than 0.5% by weight of fine polymers having a particle size of not greater than 100 microns.

It was thus found that the catalyst exhibited not only a high activity, but also imparted a high stereospecificity to the resultant polymer and that the resultant polymer had excellent powder properties.

EXAMPLE 2

(1) Polymerization of propylene:vapor phase polymerization 40 g of polypropylene powder was introduced under a propylene atmosphere into a 2-liter autoclave provided with stirring means. 19.0 mg of triethylaluminum and 14.7 mg (which corresponds to 0.40 mg as calculated in terms of Ti atoms) of the solid catalyst component A prepared in Example 1 were further introduced into the autoclave. Then, the autoclave was heated to a temperature of 60° C. while propylene gas was introduced thereinto at a flow rate such as to maintain a pressure of 15 kg/cm$^2$G therein, and the polymerization was continued for 1 hour.

76 g of polypropylene, exclusive of 40 g of the polypropylene introduced before the polymerization, was obtained. This corresponds to a catalytic activity of 5.2 kg per g of the solid catalyst component A and 190 kg per g of Ti atoms. The polymer had a bulk density of 0.42 g/cc. The polymer which could not be extracted with boiling heptane was 97.7% by weight as calculated by making a correction for the polypropylene introduced before the polymerization. The polymer had a 50% average particle size of 800 microns and 1.0% by weight of fine polymers having a particle size of not greater than 100 microns.

EXAMPLE 3

(1) Polymerization of propylene:slurry polymerization 1.5 Liters of purified heptane, 47.5 mg of triethylaluminum, and 73.3 mg (which corresponds to 2.00 mg as calculated in terms of Ti atoms) of the solid catalyst component A prepared in Example 1 were introduced at a temperature of 20° C. into a 3-liter autoclave provided with stirring means. Then, propylene was introduced into the autoclave, and the mixture was stirred under a pressure of 1 kg/cm$^2$G for 30 minutes. After the temperature of the mixture was increased to 60° C., the polymerization was started at a pressure of 4 kg/cm$^2$G.

When the polymerization was stopped after 2 hours, 406 g of polypropylene having a bulk density of 0.38 g/cc was obtained. This corresponds to a catalytic activity of 5.5 kg per g of the solid catalyst component A and 203 kg per g of Ti atoms. The polymer which could not be extracted with boiling heptane was 96.8% by weight based on the resultant total polymers. The polymer had a 50% average particle size of 400 microns.

COMPARISON EXAMPLE 1

(1) Preparation of a solid catalyst component

A solid catalyst component was obtained under the conditions described in Example 1 except that 0.5 g of anhydrous aluminum chloride was used instead of the Lewis acid reaction product.

The solid catalyst component had a content of Ti atoms of 2.10% by weight.

(2) Polymerization of propylene:liquid phase polymerization

The polymerization was carried out in the manner described in Example 1 except that 4.76 mg (which corresponds to 1.00 mg as calculated in terms of Ti atoms) of the solid catalyst component prepared as described above was used.

233 g of a white polymer was obtained. This corresponded to a catalytic activity of 4.9 kg per g of the solid catalyst component and 233 kg per g of Ti atoms. The polymer which could not be extracted with boiling heptane was 85.3% by weight. The polymer had a bulk density of 0.21 g/cc and a 50% average particle size of 200 microns.

COMPARISON EXAMPLE 2

(1) Preparation of a solid catalyst component

A solid catalyst component was obtained under the conditions as described in Example 1 except that 1.3 ml of 1,2-dichloroethane was used instead of the Lewis acid reaction product. The solid catalyst component had 1.21% by weight of the Ti deposited thereon.

(2) Polymerization of propylene:Liquid phase polymerization

The polymerization was carried out in the manner described in Example 1 except that 82.6 mg (which corresponds to 1.00 mg as calculated in terms of Ti atoms) of the solid catalyst component prepared as described above was used.

418 g of a white polymer was obtained. This corresponded to a catalytic activity of 5.1 kg per g of the solid catalyst component and 418 kg per g of Ti atoms. The polymer which could not be extracted with boiling heptane was 83.6% by weight. The polymer had a bulk density of 0.19 g/cc, a 50% average particle size of 150 microns, and 12% by weight of fine polymers having a particle size of not greater than 100 microns.

COMPARISON EXAMPLE 3

(1) Polymerization of propylene:vapor phase polymerization

The polymerization was carried out in the manner described in Example 2 except that, as the solid catalyst component, 33.0 mg (which corresponds to 0.40 mg as calculated in terms of Ti atoms) of the solid catalyst component prepared in Comparison Example 2 was used.

47 g of polypropylene, exclusive of 40 g of the polypropylene introduced before the polymerization, was obtained. This corresponded to a catalytic activity of 1.4 kg per g of the solid catalyst component and 118 kg per g of Ti atoms. The polymer which could not be extracted with boiling heptane was 89.1% by weight as calculated by making a correction for the polypropylene introduced before the polymerization. The polymer had a 50% average particle size of 350 microns and 19% by weight of fine polymers having a particle size of not greater than 100 microns.

COMPARISON EXAMPLE 4

(1) Polymerization of propylene:slurry polymerization

The polymerization was carried out in the manner described in Example 3 except that 165.3 mg (which corresponds to 2.00 mg as calculated in terms of Ti atoms) of the solid catalyst component prepared in Comparison Example 2 was used.

344 g of polypropylene having a bulk density of 0.18 g/cc was obtained. This corresponded to a catalytic activity of 2.1 kg per g of the solid catalyst component and 172 kg per g of titanium atoms. The polymer which could not be extracted with boiling heptane was 84.3% by weight based on the resulting total polymers. The polymer had a 50% average particle size of 150 microns.

EXAMPLE 4

(1) Preparation of a solid catalyst component

A support and a Lewis acid reaction product were prepared in the same manner as that described in Example 1.

A solid catalyst component was obtained under the conditions described in Example 1 except that the Lewis acid reaction product was used in a quantity of 0.3 ml instead of 1.3 ml. The solid catalyst component had 3.47% by weight of the Ti deposited thereon.

(2) Polymerization of propylene:liquid phase polymerization

The polymerization was carried out in the manner described in Example 1 except that 28.8 mg (which corresponds to 1.00 mg as calculated in terms of Ti atoms) of the solid catalyst component prepared as described above was used and 74.6 mg of triisobutylaluminum was used instead of triethylaluminum.

430 g of a white polymer was obtained. This corresponded to a polymer yield of 14.9 kg per g of the solid catalyst component and 430 kg per g of titanium atoms, respectively. The polymer which could not be extracted with boiling heptane was 92.2% by weight. The polymer had a bulk density of 0.38 g/cc and a 50% average particle size of 600 microns.

EXAMPLE 5

(1) Preparation of a support

A support was prepared under the same conditions as those described in Example 1.

(2) Preparation of a Lewis acid reaction product 8.0 g of anhydrous aluminum chloride purified by sublimation was introduced into a flask having an inner volume of 200 cc, and 31.2 ml of dry n-butyl chloride was then added dropwise to the flask. The reaction proceeded with vigorous foaming. When the dropping of the total n-butyl chloride was stopped, a dark brown viscous liquid was obtained. The reaction mixture was allowed to stand at a temperature of 60° C. for a further period of 1 hour, thereby to complete the reaction.

(3) Preparation of a solid catalyst component A

A solid catalyst component was obtained in the manner described in Example 1 by using 10.0 g of the support prepared in the above step (1), 1.3 ml of the solution prepared in the above step (2) and 2.2 ml of titanium tetrachloride. The solid catalyst component had a content of Ti atoms of 2.59% by weight.

(4) Polymerization of propylene:liquid phase polymerization

The polymerization was carried out in the manner described in Example 1 except that 38.6 mg (which corresponds to 1.00 mg as calculated in terms of Ti atoms) of the solid catalyst component thus obtained was used.

433 g of a white polymer was obtained. This corresponded to a catalytic activity of 11.2 kg per g of the solid catalyst component and 433 kg per g of titanium atoms. The polymer which could not be extracted with boiling heptane was 94.3% by weight. The resultant polymer had a bulk density of 0.39 g/cc, a 50% average particle size of 800 microns, and 0.8% by weight of fine polymers having a particle size of not greater than 100 microns.

EXAMPLE 6

(1) Preparation of a support

A support was prepared under the same conditions as those described in Example 1.

(2) Preparation of a Lewis acid reaction product 8.0 g of anhydrous aluminum chloride refined by sublimation was introduced into a flask having an inner volume of 200 cc, and 12.8 ml of dry ethyl chloroacetate was further added to the flask. This reaction system was brought to a temperature of 100° C. and left to stand at that temperature for 2 hours. Thereafter, the reaction system was brought to a reduced pressure of 0.5 mmHg to distill off the unreacted ester portions. The reaction product was washed with purified n-hexane and dried, thereby to obtain a glassy solid. This solid was dissolved in 50 ml of 1,2-dichloroethane.

(3) Preparation of a solid catalyst component A

A solid catalyst component A was obtained in the manner described in Example 1 by using 10 g of the support prepared in the above step (1), 2.1 ml of the solution prepared in the above step (2), and 2.2 ml of titanium tetrachloride. The solid catalyst component had a content of Ti atoms of 2.81% by weight.

(4) Polymerization of propylene:liquid phase polymerization

The polymerization was carried out in the manner described in Example 1 except that 35.6 mg (which corresponds to 1.00 mg as calculated in terms of Ti atoms) of the solid catalyst component A prepared as described above was used.

374 g of a white polymer having a bulk density of 0.36 g/cc was obtained. This indicated that the catalytic activity of the catalyst corresponded to a polymer yield of 10.5 kg per g of the solid catalyst component and 374 kg per g of titanium atoms. The polymer which could not be extracted with boiling heptane was 93.6% by weight. The resultant polymer had a 50% average particle size of 700 microns.

EXAMPLE 7

(1) Preparation of a solid catalyst component A

A solid catalyst component A was prepared in the manner described in Example 1 by using 10.0 g of the support prepared in step (1) of Example 1, 0.50 ml of a yellow solution of triphenylcarbonium tetrafluoroborate in chloroform which was prepared by the process described in Witschonke and Kraus, J. Am. Chem. Soc., Vol. 69, 2472(1947), and 2.2 ml of titanium tetrachloride. The solid catalyst component A contained 2.35% by weight of the Ti deposited thereon.

(2) Polymerization of propylene:liquid phase polymerization

The polymerization was carried out in the manner described in Example 1 except that 42.5 mg (which corresponds to 1.00 mg as calculated in terms of Ti atoms) of the solid catalyst component A prepared as described above was used.

335 g of a white polymer having a bulk density of 0.33 g/cc was obtained. This indicated that the catalytic activity of the catalyst corresponded to a polymer yield of 7.9 kg per g of the solid catalyst component and 335 kg per g of titanium atoms. The polymer which could not be extracted with boiling heptane was 91.4% by weight. The resultant polymer had a 50% average particle size of 550 microns.

EXAMPLE 8

(1) Preparation of a solid catalyst component A 10.0 g of the support prepared in step (1) of Example 1 and 3.3 ml of titanium tetrachloride were placed under a nitrogen atmosphere in a vibration mill pot having an inner volume of 800 ml. The pot was charged with 300 balls, each having a diameter of 12 mm and made of stainless steel SUS 314. The pot was operated at a total vibration amplitude of 4.0 mm and a rotational speed of 1,200 rpm for 16 hours thereby to pulverize the contents of the pot. 1.3 ml of the solution prepared in step (2) of Example 1 was further added to the pot to continue the pulverization for another period of 16 hours.

the powder thus obtained was introduced into 100 ml of purified n-hexane to prepare a suspension. 31.4 ml of a solution of iodine trichloride in 1,2-dichloroethane (which solution contained 7.5 millimole of iodine trichloride) was added to the suspension. The resultant suspension was heated at a temperature of 60° C. for 2 hours. After the suspension was cooled to room temperature, it was washed with purified n-hexane to obtain a solid catalyst component A in powder state. The product contained 1.95% by weight of the Ti deposited thereon.

(2) Polymerization of propylene:liquid phase polymerization

The polymerization was carried out in the manner described in Example 1 except that 51.3 mg (which corresponded to 1.00 mg as calculated in terms of Ti atoms) of the solid catalyst component prepared as described above was used.

504 g of a white polymer having a bulk density of 0.34 g/cc was obtained. This indicated that the catalytic activity of the catalyst corresponded to a polymer yield of 9.8 kg per g of the solid catalyst component and 504 kg per g of titanium atoms. The polymer which could not be extracted with boiling heptane was 95.3% by weight. The resultant polymer had a 50% average particle size of 500 microns.

EXAMPLE 9

(1) Preparation of a solid catalyst component 3.3 g of anhydrous aluminum chloride purified by sublimation and 46.2 g of ethyl p-chloro benzoate were heated to a temperature of 90° C. under a nitrogen atmosphere. After the elapse of 4 hours, a light brown liquid was obtained. The liquid was heated under reduced pressure to distill off the volatile materials, and the remaining liquid was repeatedly washed with n-hexane to a sufficient degree, thereby to produce a viscous liquid. As this liquid was difficult to handle as produced, it was dissolved in 1,2-dichloroethane so as to prepare a 50.0 ml solution.

6.6 ml of the 1,2-dichloroethane solution thus obtained and 20.0 g of anhydrous magnesium chloride were charged into a pot having an inner diameter of 100 mm and an inner volume of 800 ml and which was made of stainless steel SUS 316. The pot had been charged with 300 balls each having a diameter of 12 mm and made of SUS 316. The pot was placed on a vibration mill, and the mill was operated for 24 hours to pulverize the contents of the pot. 10.0 g of a powdery solid thus obtained was placed into a flask under a nitrogen atmosphere, and 50.0 ml of titanium tetrachloride was added to the flask. The flask was heated at a temperature of 70° C. for 2 hours. At the end of that time, the solid component was separated from the liquid component and washed with purified n-hexane to produce a solid component A. The solid catalyst component had a proportion of Ti atoms of 2.30% by weight.

(2) Polymerization of propylene:liquid phase polymerization

A 4-liter autoclave provided with stirring means, the inside atmosphere of which was completely replaced with propylene gas, was charged with 28.6 mg of triethylaluminum and 43.5 mg (which corresponds to 1.00 mg as calculated in terms of Ti atoms) of the solid catalyst component prepared as described above. Stirring was started, and 1.3 kg of liquefied propylene was introduced into the autoclave at a temperature of 30° C. After the elapse of 20 minutes, the temperature of the autoclave was increased to 70° C., and the polymerization was continued for 1 hour.

320 g of a white polymer was obtained. The polymer yield per g of the solid catalyst component A was 6.5 kg/g·solid, and the polymer yield per g of titanium atoms was 320 kg/g·Ti. The polymer which could not be extracted with boiling heptane was 94.0% by weight. The resultant polymer had a bulk density of 0.41 g/cc.

EXAMPLES 10 THROUGH 15

(1) Preparation of a solid catalyst component

Solid catalyst components were obtained in the manner described in Example 9 except that instead of 3.3 g of ethyl p-chlorobenzoate, an equivalent mole quantity of p-chlorophenyl benzoate (8.7 g), 2-chloroethyl benzoate (3.3 g), ethyl 2,4-dichlorobenzoate (4.6 g), ethyl 2-chloro-4-nitrobenzoate (5.0 g), di-2-chloroethyl terephthalate (10.9 g), 2-chloroethyl p-chlorobenzoate (4.6 g) and ethyl dichloroacetate (5.9 g) were respectively used. The proportions of titanium atoms contained in these solid catalyst components (A) are shown in Table 1.

(2) Polymerization of propylene:liquid phase polymerization

The polymerization of propylene was carried out in the manner described in Example 9 except that instead of the solid catalyst component described in Example 9, the above mentioned solid catalysts were respectively used in a quantity corresponding to 1.00 mg as calculated in terms of titanium metal.

White polymers were obtained. Values of polymer yield per g of the solid catalyst and per g of titanium atoms, proportion of the polymer which could not be extracted with boiling heptane (I.I; wt.%) and bulk density (g/cc) of the resultant polymers are shown in Table 1.

same treatment as that described in Example 9 thereby to obtain a solid catalyst component. The solid catalyst component had a content of titanium atoms of 2.14% by weight.

(2) Polymerization of propylene:liquid phase solvent-free polymerization

The polymerization of propylene was carried out in the manner described in Example 9 except that instead of the solid catalyst component prepared in Example 9, 46.7 mg (which corresponds to 1.00 mg as calculated in terms of titanium atoms) of the above mentioned solid catalyst component was used.

295 g of a white polymer was obtained. Polymer yields per g of the solid catalyst and per g of a titanium atom were 6.3 kg/g·solid and 295 kg/g·Ti, respectively. A proportion of the polymer which could not be extracted with boiling heptane (I.I.) was 93.8% by weight. The resulting polymer had a bulk density of 0.39 g/cc.

EXAMPLE 17

(1) Preparation of a solid catalyst component 3.3 g of anhydrous aluminum chloride purified by sublimation and 46.2 g of ethyl p-chlorobenzoate were heated to a temperature of 90° C. under a nitrogen atmosphere. After the elapse of 4 hours, a yellowish brown liquid was obtained. The liquid was heated under reduced pressure to distill off volatile matter. The remaining liquid was repeatedly washed with n-hexane to a sufficient degree thereby to produce a viscous liquid. As the liquid was difficult to handle as produced, it was dissolved in 1,2-dichloroethane so as to prepare a 50.0 ml solution.

6.6 ml of the 1,2-dichloroethane solution thus obtained and 20.0 g of anhydrous magnesium chloride were charged into a pot having an inner diameter of 100 mm and an inner volume of 800 ml and made of stainless steel SUS 316. The pot had been charged with 300 balls each having a diameter of 12 mm and made of SUS 316.

TABLE 1

| Example | Constituent (d) | Ti content in solid catalyst (wt. %) | Polymer yield (Kg/g-solid) | Polymer yield (Kg/g-Ti) | I.I. (wt. %) | Bulk density (g/cc) |
|---|---|---|---|---|---|---|
| 10 | p-chlorophenyl benzoate | 2.52 | 7.6 | 302 | 93.2 | 0.40 |
| 11 | 2-chloroethyl benzoate | 2.73 | 8.1 | 295 | 94.3 | 0.41 |
| 12 | ethyl 2,4-dichlorobenzoate | 2.42 | 7.6 | 315 | 94.2 | 0.41 |
| 13 | ethyl 2-chloro-4-nitrobenzoate | 2.32 | 7.7 | 332 | 91.8 | 0.39 |
| 14 | di-2-chloroethyl terephthalate | 2.70 | 8.6 | 318 | 92.4 | 0.40 |
| 15 | ethyl dichloroacetate | 2.55 | 7.2 | 282 | 90.5 | 0.38 |

EXAMPLE 16

(1) Preparation of a solid catalyst component 20.0 g of anhydrous magnesium chloride, 6.0 g of ethyl p-chlorobenzoate, and 0.4 g of anhydrous aluminum chloride were charged into the same vibration mill pot used in Example 9 under a nitrogen atmosphere, and the pot was vibrated by the same vibration mill as in Example 9 for 24 hours to pulverize the contents of the pot. 10.0 g of the pulverized solid thus obtained was placed in a flask under a nitrogen atmosphere, and 50.0 ml of titanium tetrachloride was added to the flask. Thereafter, the resultant mixture was subjected to the The pot was vibrated under a nitrogen atmosphere by means of a vibration mill for 24 hours, thereby to pulverize the contents of the pot. 10.0 g of the pulverized solid thus obtained was placed in a flask under a nitrogen atmosphere, and 50.0 ml of titanium tetrachloride was added to the flask. The resulting mixture was heated at a temperature of 70° C. for 2 hours. At the end of that time, the solid component was separated from the liquid component and washed with purified n-hexane to obtain a solid catalyst component. The solid catalyst component had a proportion of titanium atoms of 2.30% by weight.

(2) Polymerization of propylene:
pre-polymerization/liquid phase solvent-free polymerization A 4-liter autoclave provided with stirring means and having an inside atmosphere completely replaced with propylene gas was charged with 28.6 mg of triethylaluminum and 43.5 mg (which corresponds to 1.00 mg as calculated in terms of titanium atoms) of the solid catalyst component prepared as described above. Stirring was started and 1.3 kg of liquefied propylene was introduced into the autoclave at a temperature of 30° C. The prepolymerization of the propylene was carried out at that temperature for 10 minutes.

Then, the autoclave was heated to a temperarture of 70° C. over 5 minutes, and the main polymerization was carried out at that temperature for a specific period of time. After the main polymerization was complete, the unreacted monomer was withdrawn outside the autoclave to obtain a powdery polymer. A portion of the polymer was transferred into a Soxhlet's extractor and extracted with n-heptane to determine the ratio of the fraction insoluble in boiling n-heptane (isotactic polymer) to the fraction soluble in boiling n-heptane (atactic polymer). In addition, the granule properties such as bulk density, average particle size, and proportion of fine particles passing through a 105-$\mu$ sieve of the resulting polymer were determined. The results are shown in Table 2.

each in the quantity shown in Table 3 were added, and milling was continued for 16 hours to cause a reaction within the pot. Titanium tetrachloride in the quantity shown in the same Table 3 was further added, and milling was continued for another 16 hours.

10.0 g of the pulverized solid thus obtained was placed in a flask under a nitrogen atmosphere, and 50.0 ml of titanium tetrachloride was added to the flask. The resulting mixture was heated at a temperature of 70° C. for 2 hours. At the end of that time, the solid component was separated from the liquid component and washed with purified n-hexane to obtain solid catalyst components A. The proportions of titanium atoms contained in these solid catalyst components are listed in Table 3.

(2) Polymerization of propylene: liquid phase polymerization

The polymerization of propylene was carried out in the same manner as in Example 9 except that, instead of the solid catalyst component A described in Example 9, the solid catalyst components A obtained above were respectively used in a quantity corresponding to 1.00 mg as calculated in terms of titanium metal, whereupon white polymers were obtained.

Values of polymer yield per g of the solid catalyst component and per g of titanium atoms, proportion of the polymer which could not be extracted with boiling heptane and bulk density of the resultant polymers are shown in Table 3.

TABLE 3

| Example | Quantity of ethyl p-chlorobenzoate (g) | Quantity of anhydrous aluminum chloride (g) | Quantity of titanium tetrachloride (g) | Ti content in solid catalyst component (wt. %) | Polymer yield (kg/g-solid catalyst component) | (kg/g-Ti) | I.I. (wt. %) | Bulk density (g/C.C.) |
|---|---|---|---|---|---|---|---|---|
| 18 | 5.8 | 2.1 | 7.2 | 2.83 | 7.6 | 268 | 94.5 | 0.39 |
| 19 | 11.6 | 2.5 | 14.3 | 1.59 | 13.1 | 822 | 96.7 | 0.41 |
| 20 | 11.6 | 4.2 | 14.3 | 1.57 | 8.6 | 549 | 97.8 | 0.40 |
| 21 | 11.6 | 5.9 | 14.3 | 1.99 | 7.0 | 351 | 94.8 | 0.38 |
| 22 | 8.7 | 6.3 | 10.8 | 2.05 | 12.5 | 608 | 88.0 | 0.37 |
| 23 | 17.5 | 6.3 | 21.5 | 1.49 | 5.5 | 366 | 98.6 | 0.40 |

TABLE 2

| Main polymerization time (min) | Quantity of polymer (g) | Yield of polymer (Kg/g-Ti) | Polymer insoluble in boiling n-heptane (%) | Bulk density (g/cc) | Average particle size ($\mu$) |
|---|---|---|---|---|---|
| 0 | 52.4 | 52.4 | 97.3 | — | — |
| 10 | 156.1 | 156.1 | 97.4 | — | — |
| 20 | 238.9 | 238.9 | 97.1 | — | — |
| 30 | 306.8 | 306.8 | 96.8 | — | — |
| 60 | 466.3 | 466.3 | 95.0 | 0.42 | 850 |
| 90 | 594.5 | 594.5 | 94.2 | — | — |
| 120 | 712.9 | 712.9 | 93.7 | — | — |

EXAMPLES 18 through 23

(1) Preparation of a solid catalyst component A 30.0 g of anhydrous magnesium chloride and 4.0 ml of silicon tetrachloride were charged into a pot having an inner diameter of 100 mm and an inner volume of 800 ml and made of stainless steel SUS 316. The pot had been charged with 300 balls each having a diameter of 12 mm and made of SUS 316 stainless steel. The pot was vibrated under a nitrogen atmosphere by means of a vibration mill for 24 hours thereby to pulverize the contents of the pot. Then, anhydrous aluminum chloride purified by sublimation and ethyl p-chlorobenzoate

What we claim is:

1. A process for polymerizing propylene which comprises causing an olefin selected from propylene and a mixture of propylene and up to 20% by weight of another olefin to contact a catalyst comprising a combination of a component A and a component B thereby to cause the olefin to polymerize wherein:

said component A is a solid composition obtained by causing constituents (c) and (d) to react with each other in a molar ratio of (c): (d) of 1:1.1 to 500 to form binder constituent (c-d) and then causing constituents (a) and (b), in a weight ratio of (a): (b) of 1:0.01 to 1000 and (c-d) in a weight ratio of (a) to (c-d) of 1:0.005 to 50 to contact each other said binder constituent (c-d) being milled with said constituent (a), the constituent (a) being a solid which contains magnesium chloride which has been subjected to milling, the constituent (b) being a halogen containing titanium compound, the constituent (c) being a halide of aluminum and the constituent (d) being an organic compound selected from the group consisting of halohydrocarbons, halogen-containing organic acid esters, and alcohols, and the component B is an organoaluminum compound.

2. The process as claimed in claim 1, in which said constituent (a) is a member selected from the group consisting of (1) magnesium chloride and (2) magnesium chloride which has been treated with an electron donor compound; said constituent (b) is a member selected from the group consisting of (1) halogen-containing titanium compounds and (2) addition products of halogen-containing titanium compounds and electron donor compounds; and said constituent (d) is a member selected from the group consisting of (1) halohydrocarbons having 1 to 12 carbon atoms, (2) halogen-containing organic acid esters of mono- or dicarboxylic acids having 1 to 12 carbon atoms and monohydric alcohols having 1 to 12 carbon atoms, at least one of the acid and the alcohol having at least one halogen atom attached thereto, and (3) alcohols having 1 to 14 carbon atoms.

3. The process as claimed in claim 2, in which said constituent (a) is a member selected from the group consisting of (1) magnesium chloride and (2) magnesium chloride which has been treated with benzoate ester; said constituent (b) is a member selected from the group consisting of titanium halides, titanium halide complexes and addition products of titanium halides with benzoate esters; said constituent (d) is a member selected from the group consisting of acetate esters and benzoate esters having a chloro-substituent.

* * * * *